Patented May 30, 1950

2,510,034

UNITED STATES PATENT OFFICE 2,510,034

MANUFACTURE OF CHLORINE DIOXIDE

John F. Haller, Niagara Falls, N. Y., assignor to Mathieson Chemical Corporation, a corporation of Virginia No Drawing. Application January 13, 1948, Serial No. 2,131

4 Claims. (Cl. 23—152)

This invention relates to improvements in the generation of chlorine dioxide from metal chlorates with reducing gases, and more particularly to improvements in the generation of chlorine dioxide from acidified aqueous solutions of alkali and alkaline earth metal chlorates using sulfur dioxide as the reducing agent.

Acidified aqueous chlorate solutions have previously been treated with reducing agents, as gaseous sulfur dioxide, in order to generate chlorine dioxide. Under certain conditions, described in the prior art, mixtures rich in chlorine dioxide, ignoring inert gaseous diluents employed, may be obtained, but in many cases the mixtures contain undesirably large amounts of chlorine. When the proportion of chlorine increases above minor proportions, the process becomes impractical due to the necessity of separating the chlorine and because of the loss of oxidizing values in the separation procedure.

Under other conditions described in the literature considerable amounts of chlorate are reduced to chlorine and chloride, large amounts of reducing agent being thus consumed without the formation of the desired product. The prior art discourages the use of temperatures above 40° C. and characterizes temperatures above 60° C. as dangerous.

According to the process of the present invention chlorine dioxide substantially free from chlorine and hydrogen chloride is obtained with greatly improved efficiency with respect to the chlorate and reducing agent consumed.

The process is applicable to acidified aqueous chlorate solutions containing not more than about 10% of chlorate based on the chlorate and water present, the chlorate being calculated as sodium chlorate. It is further characterized in that the generation of the chlorine dioxide from the acidified chlorate solution is caused to proceed at temperatures within the range 60° C. to 75° C. Contrary to the statements in the literature I have not found that operating in this temperature range is any more hazardous than operating at lower temperatures, but due care should, of course, be exercised to the end of assuring ample dilution of the product gas. I have found that when solutions containing 10% or less of chlorate, calculated as sodium chlorate, are treated with reducing agents at temperatures without the stated range, the reaction proceeds largely with the formation of sulfate and chlorine or chloride.

The advantages of my invention are most fully realized with chlorate solutions containing substantially less than 10% chlorate calculated as sodium chlorate, e. g. 5%. Solutions having a concentration of 1% or even lower may be employed.

Although sulfur dioxide is the reducing gas preferred for use according to the invention, other reducing gases, as carbon monoxide, may be employed. The reducing gas, as indicated supra, should be suitably diluted with a gas which is inert with respect to the reagents and products of the reaction. Air or nitrogen are quite suitable. Using air, the partial pressure of the chlorine dioxide should preferably not be allowed to become greater than about 70 m. m. Air-chlorine dioxide mixtures having higher concentrations of chlorine dioxide may under certain conditions be used as long as the explosion tolerance of the equipment is not exceeded.

Since chloric acid, $HClO_3$, is produced on the acidification of any water-soluble chlorate in aqueous solution and since chloric acid is the real source of the chlorine dioxide in the reaction herein, any such chlorate may be employed in the practice of the invention although the alkali and alkaline earth metal chlorates are preferred. Normally, I employ either sodium or calcium chlorate because of their ready availability and relatively low cost. Calcium chlorate is substantially equivalent to sodium chlorate in terms of the quantity of chloric acid afforded, i. e. one gram of sodium chlorate yields approximately .794 gram of chloric acid, one gram of calcium chlorate, approximately .816 gram.

In the practice of the invention, the acidification of the chlorate solution may be effected with any strong mineral acid. Generally I use sulfuric acid. The acid should be added in a quantity sufficient to maintain the pH of the reaction mixture below 2 at all times. If desired, the acid may be added in increments.

The process of the present invention is applicable to chlorate solutions specially prepared or to solutions which have been originally more concentrated with respect to chlorate but which through prior use in the generation of chlorine dioxide have become diluted to concentrations of less than 10%, calculated as above indicated. Thus, my process may be integrated with prior processes characterized by the use of low temperatures and chlorate solutions of high concentration.

In the following examples submitted in illustration of my invention, the percentage of chlorate is based on the weight of chlorate and water in the reaction mixture without regard to the acid present.

Example I

A solution was prepared by admixing 100 volumes of dilute sulfuric acid (prepared from 400 volumes of concentrated sulfuric acid and 600 volumes of water) with 100 volumes of 5% aqueous sodium chlorate solution. The thus acidified chlorate solution was treated at 62° C. with a gaseous mixture of 5% by volume of sulfur dioxide and 95% by volume of nitrogen. Chlorine dioxide was generated with a yield of 60.2% based on the chlorate used. In three similar experiments where the temperature was held at 79° C., 42° C., and 30° C., the chlorine dioxide yield was only 25.9%, 22.2% and 15.3%, respectively.

An acidified sodium chlorate solution containing 4.5% chlorate yielded only 5% of chlorine dioxide when held at 26° C.

Example II

A solution of acidified chlorate was prepared as described in Example I except that less chlorate was used, the concentration of the solution being 3.8%. When this solution was treated with the 5:95 mixture of sulfur dioxide and nitrogen, the yield of chlorine dioxide was 52.0%.

Example III

A 9.1% chlorate solution prepared as described in Example I, treated at 75° C., with a 5:95 mixture of sulfur dioxide and nitrogen gave a chlorine dioxide yield of 70.0%.

Example IV 100 volumes of dilute sulfuric acid solution prepared as described in Example I was admixed with 100 volumes of an 8% aqueous solution of calcium chlorate. A mixture of 5% by volume of sulfur dioxide and 95% of air was passed through the slurry at a temperature of 65° C. The yield of chlorine dioxide amounted to 68.1% based on the chlorate used.

Example V

Calcium chlorate solution and dilute sulfuric acid were admixed as described in Example IV and the slurry allowed to settle. On decanting off the clear liquor and passing diluted sulfur dioxide (5% $SO_2$ and 95% nitrogen) at 69° C., chlorine dioxide was generated in a yield of 67.2%.

I claim:

1. In the process for the generation of chlorine dioxide characterized by the reacting of an acidified aqueous solution of a water-soluble metal chlorate with a reducing gas in the presence of an inert diluent gas employed in an amount sufficient to insure dilution of the chlorine dioxide to a safe concentration, the improvement which comprises maintaining the acidified aqueous solution at a pH below 2 and at a chlorate concentration, calculated as sodium chlorate, below 10% on an acid-free basis while keeping the reaction temperature within the range 60–75° C.

2. A process according to claim 1 where the chlorate concentration is kept at about 5% and where the acidification of the solution is effected with sulfuric acid.

3. A process according to claim 2 where the metal chlorate is sodium chlorate.

4. A process according to claim 3 where the reducing agent is sulfur dioxide.

JOHN F. HALLER.

REFERENCES CITED

The following references are of record in the file of this patent:

UNITED STATES PATENTS

| Number | Name | Date |
|---|---|---|
| 1,904,190 | Becher | Apr. 18, 1933 |
| 2,332,181 | Soule | Oct. 19, 1943 |
| 2,373,830 | Holst | Apr. 17, 1945 |